(12) United States Patent
Chapman (10) Patent No.: US 9,082,068 B1
(45) Date of Patent: Jul. 14, 2015

(54) COLOR SHIFT PRINTING WITHOUT USING SPECIAL MARKING MATERIALS

(71) Applicant: XEROX CORPORATION, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/270,868

(22) Filed: May 6, 2014

(51) Int. Cl.
*H04N 1/40* (2006.01)
*G06K 15/02* (2006.01)

(52) U.S. Cl.
CPC .................................. *G06K 15/1878* (2013.01)

(58) Field of Classification Search
CPC .... B42D 25/29; B42D 2035/24; B42D 25/00; B42D 2033/26; B42D 2035/20; B42D 2033/20; B42D 25/355; B42D 2035/34; B42D 15/00; G03H 1/0011; G03H 1/0256; B41M 3/148; B41M 3/008; B41M 3/14; B41M 3/144
USPC ......... 358/1.9, 2.1, 3.28, 468; 283/70–74, 91, 283/113; 359/2, 296, 567
See application file for complete search history.

(56) References Cited

U.S. PATENT DOCUMENTS

| | | | |
|---|---|---|---|
| 5,286,286 A | 2/1994 | Winnik et al. | |
| 5,734,752 A | 3/1998 | Knox | |
| 7,324,241 B2 | 1/2008 | Eschbach et al. | |
| 7,391,529 B2 | 6/2008 | Glaspy, Jr. et al. | |
| 7,639,400 B2 | 12/2009 | Hains | |
| 7,852,515 B2 | 12/2010 | Eschbach et al. | |
| 8,064,100 B2 | 11/2011 | Braun et al. | |
| 8,111,432 B2 | 2/2012 | Eschbach et al. | |
| 8,147,932 B2 | 4/2012 | Despland et al. | |
| 8,310,718 B2 | 11/2012 | Chapman et al. | |
| 8,894,098 B2 * | 11/2014 | MacPherson et al. | .......... 283/92 |
| 2002/0160194 A1 | 10/2002 | Phillips et al. | |
| 2003/0170471 A1 | 9/2003 | Seto et al. | |
| 2007/0017990 A1 | 1/2007 | Katsurabayashi | |

(Continued)

FOREIGN PATENT DOCUMENTS

| | | |
|---|---|---|
| CA | 2788413 | 8/2011 |
| EP | 2528746 | 3/2014 |
| WO | 2011091969 | 8/2011 |

OTHER PUBLICATIONS http://central.fraudfighter.com/counterfeit-detection-id-verification/bid/42471/Detecting-Counterfeit-Money-Part-II-Color-shifting-Numbers, May 5, 2014, pp. 1-2.

*Primary Examiner* — Thomas D Lee
*Assistant Examiner* — Stephen M Brinich
(74) *Attorney, Agent, or Firm* — Gibb & Riley, LLC (57) ABSTRACT

Methods and devices receive a document having an apparent color shift region. Such methods and devices automatically select first and second colors to have different reflectance properties for use in the apparent color shift region, and these methods and devices automatically control a first pixel density of the first color to be less than a second pixel density of the second color within the apparent color shift region. The methods and devices print the document. The selection of the first color and the second color, and the control of the first pixel density to be less than the second pixel density causes the second color to have a greater change in brightness appearance relative to a change in brightness appearance of the first color when the printed document is viewed from different angles relative to a light source.

16 Claims, 6 Drawing Sheets

(56) References Cited

U.S. PATENT DOCUMENTS

| | | |
|---|---|---|
| 2007/0139680 A1 | 6/2007 | Eschbach et al. |
| 2007/0139681 A1 | 6/2007 | Eschbach et al. |
| 2007/0262579 A1 | 11/2007 | Bala et al. |
| 2008/0122217 A1 | 5/2008 | Rancien et al. |
| 2008/0299333 A1 | 12/2008 | Bala et al. |
| 2008/0302263 A1 | 12/2008 | Eschbach et al. |
| 2009/0072185 A1 | 3/2009 | Raksha et al. |
| 2009/0207433 A1 | 8/2009 | Wang et al. |
| 2009/0262400 A1 | 10/2009 | Eschbach et al. |
| 2010/0128321 A1 | 5/2010 | Wang et al. |
| 2010/0214595 A1 | 8/2010 | Chapman et al. |
| 2010/0238513 A1 | 9/2010 | Morales et al. |
| 2011/0127331 A1 | 6/2011 | Zhao et al. |
| 2011/0157539 A1* | 6/2011 | Rosset .......... 349/193 |
| 2011/0191670 A1 | 8/2011 | Hoppenot et al. |
| 2011/0205569 A1 | 8/2011 | Eschbach et al. |
| 2012/0140290 A1 | 6/2012 | Eschbach et al. |
| 2013/0113200 A1 | 5/2013 | Lister |
| 2013/0128319 A1 | 5/2013 | Kenehan |
| 2013/0161939 A1 | 6/2013 | Kasperchik et al. |
| 2014/0085392 A1 | 3/2014 | Chapman et al. |

\* cited by examiner

COLOR SHIFT PRINTING WITHOUT USING SPECIAL MARKING MATERIALS

BACKGROUND

Systems and methods herein generally relate to security printing and more particularly to systems, devices, and methods that produce an apparent color shift region within a document.

In the area of security printing, documents are protected from copying, forging, and counterfeiting using multiple techniques. Some methods of security printing use standard materials such as papers, inks, and toners; however, more typically security printing requires special and expensive materials. Example documents needing security printing include legal documents, negotiable documents, prescriptions, etc., where a user would like to be able to have a high level of confidence that the document is genuine.

For example, color shifting ink appears as one color from a certain angle and another color from another angle. However, such color shifting printing requires a very specialized ink, that can be regulated and/or expensive. Many US currency denominations use regulated color-shifting ink to print the numerals located in the corners on the front of the bill. One example of color shifting printing is on a US twenty dollar bill at the bottom right corner where the number 20 appears gold or green depending on how the bill is tilted. Similarly, on a genuine $100 banknote, the green color will "shift" to grey and back to green as you tilt the bill back and forth to change the viewing angle (and the $100 bill available October 2013 goes from copper to green).

The "optically variable ink," as it is officially called, used to print currency is not widely commercially available. Most of it comes from a Swiss manufacturer (SCIPA), which grants the U.S. exclusive rights to the green-and-black ink used for printing dollars. One feature of optically variable ink is that such ink cannot be replicated by copiers, because copiers only "see" and replicate patterns from a fixed angle.

Some printing techniques enable printing small overt security features that could not easily be copied by a digital copier, if at all. However documents protected with such features can potentially be reproduced with reverse engineering.

SUMMARY

Exemplary methods herein receive a document to be printed into a computerized device. The document includes a designation of an apparent color shift region within the document. The apparent color shift region comprises a background and a contrasting design in the foreground. With such, the methods automatically (using the computerized device) select a first color to have a first specular reflectance property as the background and a second color to have a second specular reflectance property different from the first specular reflectance property as the foreground for use in the apparent color shift region. For example, the second color can have a specular reflectance property that is at least twice the specular reflectance property of the first color. Further, when selecting the first and second colors, such methods may actually change the color, gloss level, etc., from that designated by the original document to achieve sufficient specular reflectance property difference between the first and second color.

The methods automatically, using the computerized device, rasterize the document to produce a bitmap. The standard, unaltered bitmap has the first color uniformly applied to a first density of pixels in the apparent color shift region to form the background. The standard bitmap also has the second color non-uniformly applied to a second density of pixels in the apparent color shift region. The standard bitmap leaves some non-printing pixels in the apparent color shift region.

Rather than just using the standard bitmap that the document alone would produce, during the rasterization process, the methods automatically control the first pixel density of the first color to be less than the second pixel density of the second color within said apparent color shift region by, for example, assigning the second color to additional pixels than the second color would be applied in the standard bitmap and/or reducing the pixel density of the first color in the apparent color shift region. More specifically, these methods assign the second color to some or all of the non-printing pixels of the apparent color shift region to increase the second density of pixels relative to the first density of pixels in the apparent color shift region, so as to revise the standard bitmap that would otherwise be output by the rasterizing process.

The first color will be printed at the first density of pixels in areas of the apparent color shift region where the document designates the first color to be present. The assignment of the second color to additional pixels causes the second color to be printed at the second density of pixels in areas of the apparent color shift region where the document designates the second color be present. The assignment of the second color to non-printing pixels of the apparent color shift region can, in some situations, use all the non-printing pixels in areas of the apparent color shift region where the document designates the second color to be present.

Such methods then print the document (using a printing device that is operatively (meaning directly or indirectly) connected to the computerized device. The processes of selecting the first color to have a first specular reflectance property as the background and the second color to have a second specular reflectance property that is different from the first specular reflectance property, and the process of controlling the first pixel density to be less than the second pixel density causes the second color to have a greater change in brightness appearance relative to a change in brightness appearance of the first color when the printed document is viewed from different angles relative to a light source.

Systems herein can be included in a single device or can use multiple devices connected locally or connected over a wide area network. Therefore, such systems will include, at a minimum, a processor and a printer operatively connected to the processor. The processor receives the document to be printed. The document includes a designation of an apparent color shift region within the document. The apparent color shift region comprises a background and a design in a foreground.

The processor automatically selects a first color to have a first specular reflectance property as the background of the apparent color shift region, and a second color to have a second specular reflectance property different from the first specular reflectance property as the foreground for use in the apparent color shift region.

The processor automatically rasterizes the document to produce a bitmap having the first color uniformly applied to a first density of pixels in the apparent color shift region and the second color non-uniformly applied to a second density of pixels in the apparent color shift region leaving non-printing pixels in the apparent color shift region. During the raster processing (or in a separate step after the raster processing) the processor automatically controls the first pixel density of the first color to be less than the second pixel density of the second color within said apparent color shift region by, for example, assigning the second color to additional pixels to assign the second color to ones of the non-printing pixels of the apparent color shift region and/or reducing the pixel density of the first color in the apparent color shift region to increase the second density of pixels relative to the first density of pixels in the apparent color shift region and to produce a bitmap or a revised bitmap.

The processor assigning the marking materials to pixels causes the first color to be printed by the printer at the first density of pixels in areas of the apparent color shift region where the document designates the first color be present. The processor assigning the marking materials to pixels also causes the second color to be printed by the printer at the second density of pixels in areas of the apparent color shift region where the document designates the second color be present. Again, in some situations, the second color can be assigned to all the non-printing pixels in areas of the apparent color shift region where the document designates the second color be present.

The printer prints the document. Having the processor select the first color to have a first specular reflectance property as the background and the second color to have a second specular reflectance property that is different from the first specular reflectance property, and having the processor control the first pixel density to be less than the second pixel density causes the second color to have a greater change in brightness appearance relative to the change in brightness appearance of the first color when the printed document is viewed from different angles relative to a light source.

These and other features are described in, or are apparent from, the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various exemplary systems and methods are described in detail below, with reference to the attached drawing figures, in which.

DETAILED DESCRIPTION

As mentioned above, optically variable ink is a very specialized ink, that can be regulated and/or expensive. Therefore, the systems and methods herein provide color shifting printing using inks that are commonly used in printers (e.g., cyan, magenta, yellow, and black (CMYK) inks or red, green & blue (RGB) inks). More specifically, the methods and systems herein provide a method of color shifting without using specialized printing materials, using just standard printing marking materials. This is accomplished by creating two different patterns of printing pixels in the bitmap that creates a watermark that shifts in color when tilting, while always remaining viewable when tilting. The color shift is accomplished by the differential specular reflective properties.

Figure 1:
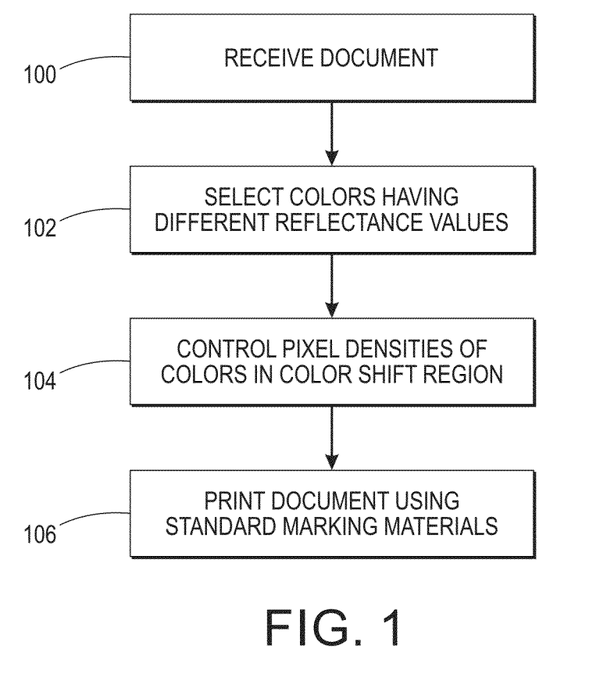
FIG. 1 is a flow diagram of various methods herein.

FIG. 1 is flowchart illustrating exemplary methods herein. In item 100, these methods receive a document to be printed into a computerized device. The document includes a designation of an apparent color shift region within the document. The apparent color shift region comprises a uniform background and a non-uniform design in the foreground.

For example, in item 100, a user may utilize a document preparation or document editing application to identify a region within a document that is to have a color shift appearance when printed. The apparent color shift region so identified by the user may utilize various pixel densities and colors selected by the user operating the document preparation/editing application. As explained below, the methods herein can alter the user-specified pixel density and color automatically without user input to achieve the color shift (or the user can be advised of such changes and can be allowed to approve, disapprove, or adjust such changes).

With such, the methods automatically in item 102 (using the computerized device) select a first color that has a first specular reflectance property (or reflectance value) as the background and a second color that has a second specular reflectance property (or reflectance value) different from the first specular reflectance property as the foreground pattern for use in the apparent color shift region. For example, the second color can have a specular reflectance property that is at least twice the specular reflectance property of the first color. Also, the foreground can be brighter than the background and vice versa. Thus, the first and second colors discussed herein can be inverted so that the background rectangle is solid yellow with a magenta pattern that knocks out the yellow and there is no paper showing. The bird can be the magenta pattern only with paper showing. In both polarities the viewer tends to notice the fine details of the bird.

When selecting the first and second colors, the processing in item 102 can select the original colors specified by the user, or can change these colors to achieve sufficiently different specular reflectance properties. Further, when selecting the first and second colors in item 102, such methods may actually change the color, gloss level, etc., from that designated by the original document to achieve sufficient specular reflectance property difference between the first and second color. When making any such changes, the processing in item 102 can notify the user of the changes and/or provide the user with an option to accept or reject the changes (or for the user to make additional changes).

In item 104, the methods automatically, again using the computerized device, control the pixel densities of colors in the color shift region during, for example the rasterization of the document to produce a bitmap. The standard, unaltered bitmap leaves non-printing pixels in the apparent color shift region (because of halftoning techniques, etc.).

Rather than just using the standard bitmap that the document alone would produce, during the pixel density adjustment process in item 104, the methods can automatically assign the second color to additional pixels than the second color would be applied in the standard bitmap and/or reduce the pixel density of the first color in the apparent color shift region. More specifically, these methods can assign the second color to some or all of the non-printing pixels of the apparent color shift region to increase the second density of pixels of the second color relative to the first density of pixels of the first color in the apparent color shift region, so as to revise the standard bitmap that would otherwise be output by the standard rasterizing process.

With the processing in items 104, the first color will be printed at the first density of pixels in areas of the apparent color shift region where the document designates the first color to be present. The process of controlling the pixel densities of colors in the color shift region causes the first color to be printed at the first density of pixels in areas of the apparent color shift region where the document designates the first color be present, and the second color to be printed at the second density of pixels in areas of the apparent color shift region where the document designates the second color be present. The first pixel density can be, for example, less than 0.8 times the second pixel density, and highly effective results are found when the first pixel density is less than half (less than 0.5 times) the second pixel density (and even better results occur when the first density is less than one quarter (less than 0.25 times) the second pixel density. The assignment of the second color to non-printing pixels of the apparent color shift region can, in some situations, use all the non-printing pixels in areas of the apparent color shift region where the document designates the second color to be present.

In item 106, such methods then print the document (using a printing device that is operatively (meaning directly or indirectly) connected to the computerized device). The processes of selecting the first color to have a first specular reflectance property as the background and the second color to have a second specular reflectance property that is different from the first specular reflectance property in item 102, and the process of controlling the pixel densities of colors in the color shift region (in item 104) causes the second color to have a greater change in brightness appearance relative to a change in brightness appearance of the first color when the printed document is viewed from different angles relative to a light source (without requiring specialized printing materials or using different marking material heights (e.g., different toner pile heights)).

Figure 2:
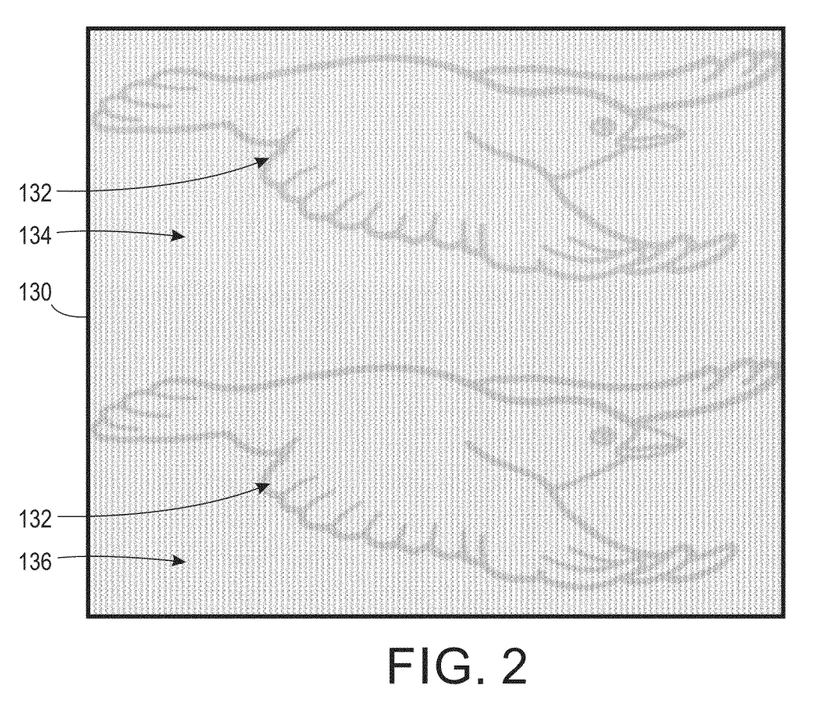
FIG. 2 is a schematic diagram illustrating printing produced by systems and methods herein.

FIG. 2 is a bitmap 130 containing birds 132 that was printed using the methods and systems described herein. In the bitmap 130 shown in FIG. 2, one background 134 is solid cyan (top) and another background 136 is magenta (bottom). As can be seen in FIG. 2, the white hole pattern (pattern of non-printed pixels) was applied so that the cyan or magenta areas (134, 136) are relatively sparse backgrounds (e.g., having a pixel density of only 20%, 40%, 60%, etc.). The non-printed pixels are assigned in the bitmap used for printing to be sparse enough so the bird 132 is visible at all angles when tilting the sample. The backgrounds 134, 136 are also sparse enough to reduce the specular reflectance of the background areas 134, 136.

In FIG. 2, in the foreground (bird 132) all pixels are filled with yellow so that the foreground is yellow with cyan (top) or magenta (bottom) on top of the yellow (or knocking the yellow out underneath). There are no non-printing pixels (e.g., holes) in the foreground pattern (e.g., the bird 132 in FIG. 2 consists of only yellow and cyan or yellow and magenta, without non-printed white pixels).

In the example in FIG. 2, yellow is chosen as the foreground pattern in this example due to yellow having a relatively higher specular reflectance property. For example, violet and blues have the lowest percentage of specular reflectance, and yellows and reds have the highest percentage of specular reflectance. In some systems, yellows and reds can have, for example, 8 times the percentage of specular reflectance relative to blues and violets, greens can have 6 times the percentage of specular reflectance relative to blues and violets, etc. Knocking out some of the yellow gives the bird more of a background watermark appearance along with adding a color with less specular reflectance. In the example shown in FIG. 2, there are no holes in the yellow foreground pattern 132 (e.g. the bird 132 in the top of FIG. 2 is composed of yellow 132 and cyan 134 without white).

Figure 3:
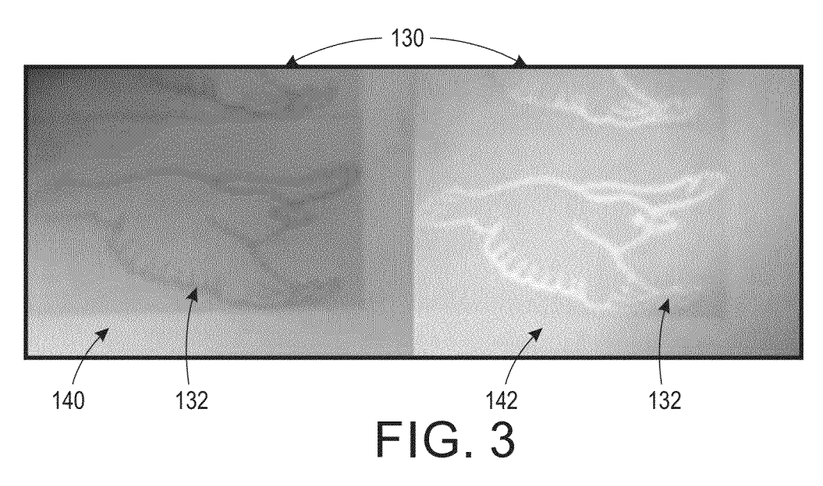
FIG. 3 is a bitmap produced by systems and methods herein.

FIG. 3 are two photographs 140, 142 of the same sheet printed using bitmap 130 viewed from two different angles relative to a light source. As can be seen in FIG. 3, the bird 132 changes from a relatively darker color/brightness in sheet 140 to a relatively lighter color/brightness in sheet 142 based on the relative position of the light source, observer, and sample. The magenta 136 or cyan 134 pattern that knocked out yellow portions of the bird 132 are less visible on the brighter viewing sheet 142 of FIG. 3 relative to sheet 140, aiding in the color shift.

The reasons why the background 134, 136 is less visible in sheet 142 (relative to sheet 140 in FIG. 3) is that the diffuse reflectance properties of the background result in only a small change in color/brightness as the viewing/light angle changes. To the contrary, because the foreground 132 is printed more densely, using a more reflective color (relative to the background) the change in specular reflectance is greater in the foreground 132 relative to the background, as the viewed angle to the light source changes.

If different colors that have similar reflectance properties are printed as foreground/background at similar densities (similar halftone rates), no color shift will be observed between the foreground and background as the viewed angle to a light source changes. However, the methods and systems herein automatically adjust both the printing density (halftone property in the bitmap are changed from standard amounts) and automatically select or change the colors to have sufficiently different specular reflectance properties (specular reflectance properties that are different above a previously determined amount) in order to produce color shift items in a printed image for the user (again, using the standard inks that are used for all other printing purposes).

Figure 4:
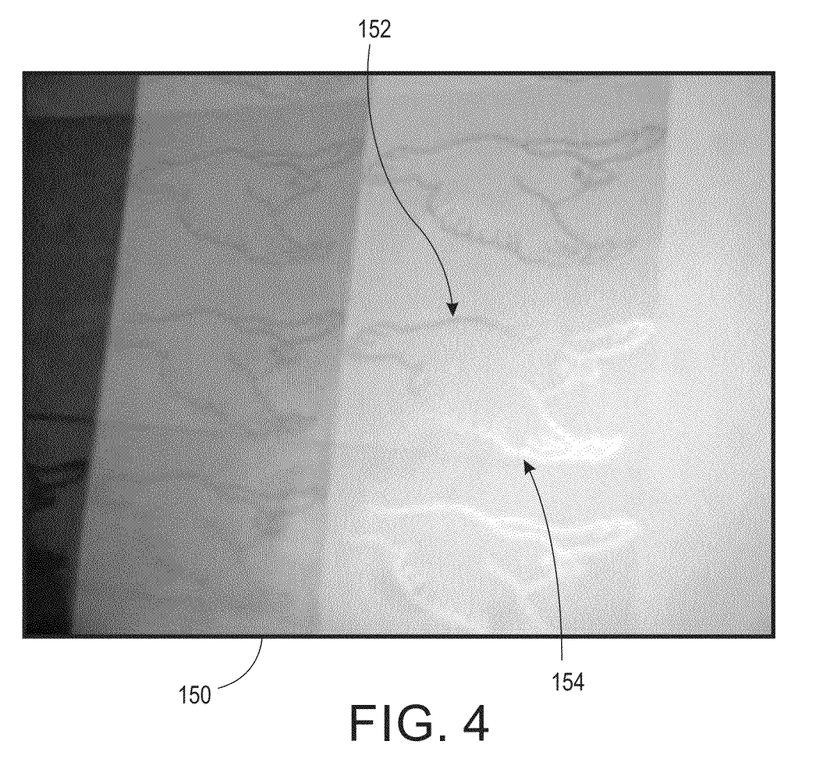
FIG. 4 are photographs illustrating printing produced by systems and methods herein.

FIG. 4 is a photograph of a printed sheet of the same bird images printed using different backgrounds, and the printed sheet in FIG. 4 is curved to allow the bird images to change the viewed angles relative to a light source (with the light source and observer in fixed relative positions). In one of the foreground birds (middle bird on right side of the printed sheet 150) the color changes from "brown mustard" 152 to "yellow mustard" 154 as the curvature of the sheet causes the viewed angle relative to the light source to change (again, while the foreground bird remains visible from all angles).

Figure 5:
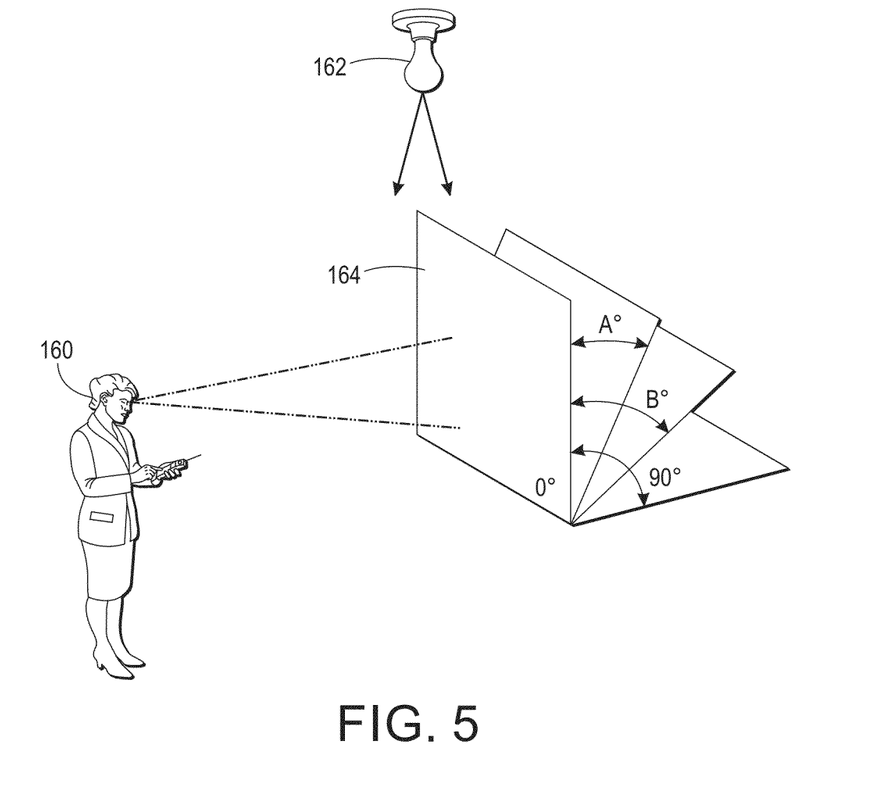
FIG. 5 is a schematic diagram illustrating effects produced by systems and methods herein.

As mentioned above, the processes of selecting the first color to have a first specular reflectance property as the background and the second color to have a second specular reflectance property that is different from (greater than) the first specular reflectance property in item, and the process of controlling the pixel densities of colors in the color shift region causes the second color to have a color shift (e.g., a greater change in brightness appearance relative to a change in brightness appearance of the first color when the printed document is viewed from different angles relative to a light source). As shown in FIG. 5, the observation of the color shift depends on the relative positions of the light source 162, the observer 160, and the printed sheet 164. As shown in FIG. 5, the observer 160 would observe one color or brightness of the foregoing relative to the background when the printed sheet 164 is viewed at a perpendicular angle (e.g., at 0°) and a different color or brightness of the foregoing relative to the background as the printed sheet of media 164 is tilted so that the printed sheet 164 is viewed at different angles (e.g., at A°, B°, etc.).

Figure 6:
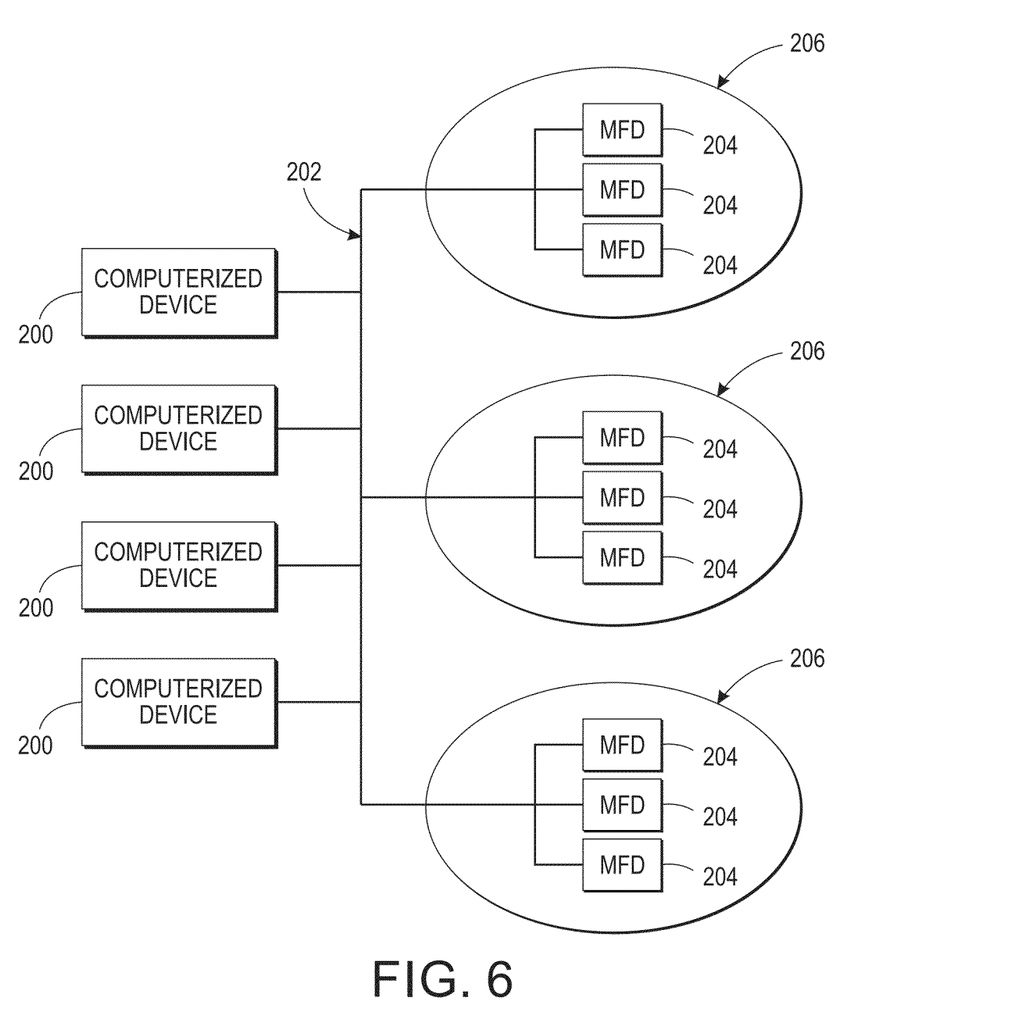
FIG. 6 is a schematic diagram illustrating systems herein.

As shown in FIG. 6, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 7:
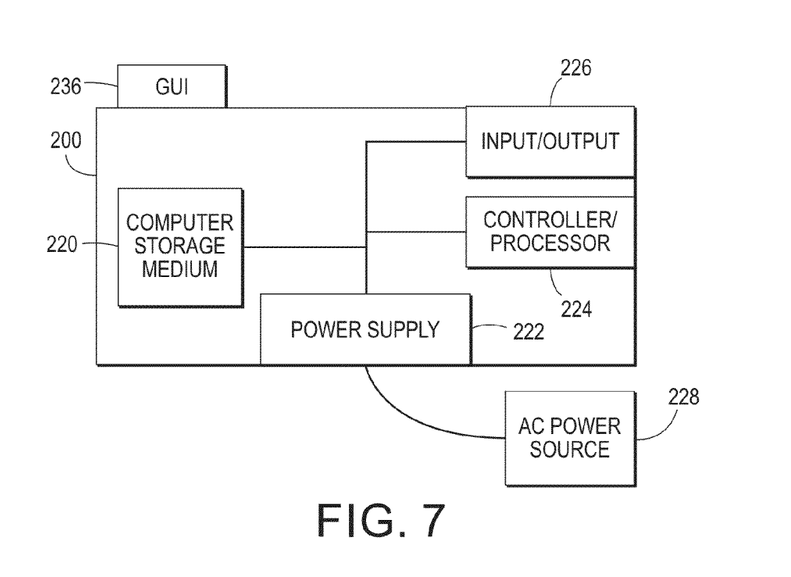
FIG. 7 is a schematic diagram illustrating devices herein.

FIG. 7 illustrates a computerized device 200, which can be used with systems and methods herein and can comprise, for example, a print server, a personal computer, a portable computing device, etc. The computerized device 200 includes a controller/tangible processor 224 and a communications port (input/output) 226 operatively connected to the tangible processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The tangible processor 224 controls the various actions of the computerized device. A non-transitory computer storage medium device 220 (which can be optical, magnetic, capacitor based, etc.) is readable by the tangible processor 224 and stores instructions that the tangible processor 224 executes to allow the computerized device to perform its various functions, such as those described herein. Thus, as shown in FIG. 7, a body housing has one or more functional components that operate on power supplied from an alternating current (AC) source 228 by the power supply 222. The power supply 222 can comprise a power storage element (e.g., a battery, etc).

Figure 8:
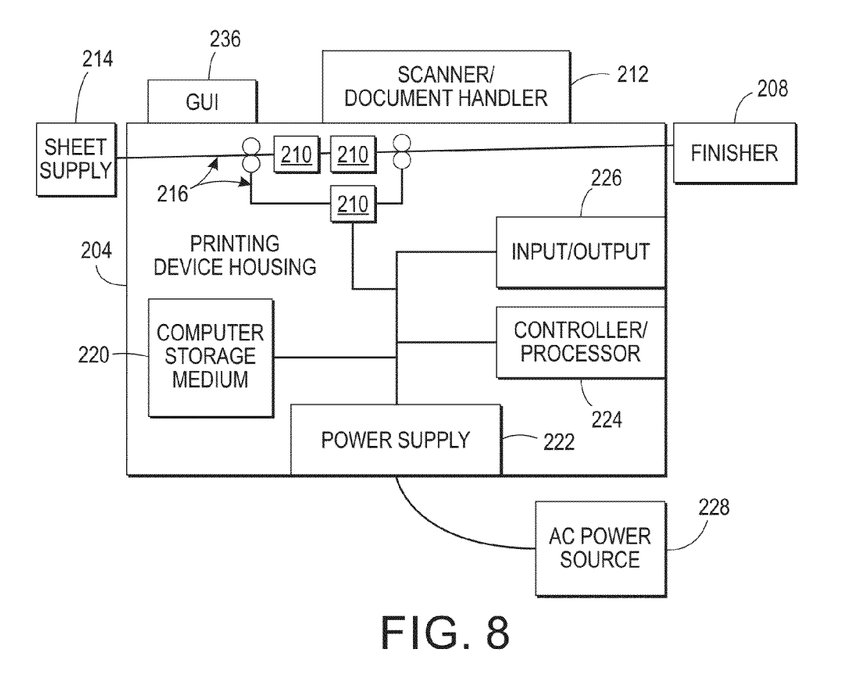
FIG. 8 is a schematic diagram illustrating devices herein.

FIG. 8 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the tangible processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Therefore, systems herein can be included in a single device 200/204 or can use multiple devices connected locally or connected over a wide area network 202. Therefore, such systems will include, at a minimum, a processor 224 and a printer 204 operatively connected to the processor 224. The processor 224 receives the document to be printed. The document includes a designation of an apparent color shift region within the document. The apparent color shift region comprises a background and a design in a foreground.

The processor 224 automatically selects (or changes) a first color to have a first specular reflectance property as the background of the apparent color shift region, and a second color to have a second specular reflectance property different from the first specular reflectance property as the foreground for use in the apparent color shift region.

The processor 224 automatically rasterizes the document to produce a bitmap having the first color uniformly applied to a first density of pixels in the apparent color shift region and the second color non-uniformly applied to a second density of pixels in the apparent color shift region leaving non-printing pixels in the apparent color shift region. The processor 224 automatically controls the pixel densities of colors in the color shift region by, for example, assigning the second color to additional pixels to assign the second color to ones of the non-printing pixels of the apparent color shift region to increase the second density of pixels of the second color in the apparent color shift region and to produce (or revise) the bitmap.

The processor 224 controlling the pixel densities of colors in the color shift region causes the first color to be printed by the printer 204 at the first density of pixels in areas of the apparent color shift region where the document designates the first color be present, and also causes the second color to be printed by the printer 204 at the second density of pixels in areas of the apparent color shift region where the document designates the second color be present. Again, in some situations, the second color can be assigned to all the non-printing pixels in areas of the apparent color shift region where the document designates the second color be present.

The printer 204 prints the document. The processor 224 selecting the first color to have a first specular reflectance property as the background and the second color to have a second specular reflectance property that is different from the first specular reflectance property, and controlling the first pixel density to be less than the second pixel density causes the second color to have a greater change in brightness appearance relative to the change in brightness appearance of the first color when the printed document is viewed from different angles relative to a light source.

As would be understood by those ordinarily skilled in the art, the printing device 204 shown in FIG. 8 is only one example and the systems and methods herein are equally applicable to other types of printing devices that may include fewer components or more components. For example, while a limited number of printing engines and paper paths are illustrated in FIG. 8, those ordinarily skilled in the art would understand that many more paper paths and additional printing engines could be included within any printing device used with systems and methods herein.

Further, the "standard" toners, inks, and marking materials that are utilized by the methods and systems herein are those marking materials that are used to perform generalize printing of documents, photographs, artwork, and other two-dimensional items (such as standard CMYK toners, RGB inks, etc.) in mass-produced consumer printers. To the contrary, "specialized" inks, toners, and marking materials are those used for printing a specialized document that has a single function, such as magnetic inks used for printing checks, color shifting inks used for printing currency, specialized white or gloss materials used in specialty photographic printing systems, etc. Therefore, the methods and systems herein provide a watermark that changes as the viewing angle changes, without incurring the expense and sophistication required in specialized printing systems.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

A raster image tangible processor (RIP) is a component used in a printing system that produces a raster image also known as a bitmap. The bitmap is then sent to a printing device for output. Raster image processing is the process that turns vector digital information into a high-resolution raster image.

A "pixel" refers to the smallest segment into which an image can be divided. Received pixels of an input image are associated with a color value defined in terms of a color space, such as color, intensity, lightness, brightness, or some mathematical transformation thereof. Pixel color values may be converted to a chrominance-luminance space using, for instance, a RBG-to-YCbCr converter to obtain luminance (Y) and chrominance (Cb,Cr) values. It should be appreciated that pixels may be represented by values other than RGB or YCbCr.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

To render an image is to reduce the image data (or a signal thereof) to viewable form; store the image data to memory or a storage device for subsequent retrieval; or communicate the image data to another device. Such communication may take the form of transmitting a digital signal of the image data over a network.

The term halftoning means a process of representing a contone image by a bi-level image such that, when viewed from a suitable distance, the bi-level image gives the same impression as the contone image. Halftoning reduces the number of quantization levels per pixel in a digital image. Over the long history of halftoning, a number of halftoning techniques have been developed which are adapted for different applications. Halftoning techniques are widely employed in the printing and display of digital images and are used because the physical processes involved are binary in nature or because the processes being used have been restricted to binary operation for reasons of cost, speed, memory, or stability in the presence of process fluctuations. Classical halftone screening applies a mask of threshold values to each color of the multi-bit image. Thresholds are stored as a matrix in a repetitive pattern. Each tile of the repetitive pattern of the matrix is a halftone cell. Digital halftones generated using threshold arrays that tile the image plane were originally designed to be periodic for simplicity and to minimize memory requirements. With the increase in computational power and memory, these constraints become less stringent. Digital halftoning uses a raster image or bitmap within which each monochrome picture element or pixel may be ON or OFF (ink or no ink). Consequently, to emulate the photographic halftone cell, the digital halftone cell must contain groups of monochrome pixels within the same-sized cell area.

In addition, the terms automated or automatically mean that once a process is started (by a machine or a user), one or more machines perform the process without further input from any user. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    receiving a document to be printed into a computerized device, said document including a designation of an apparent color shift region within said document;
    automatically, using said computerized device, selecting a first color to have a first reflectance property and a second color to have a second reflectance property different from said first reflectance property for use in said apparent color shift region;
    automatically, using said computerized device, controlling a first pixel density of said first color to be less than a second pixel density of said second color within said apparent color shift region; and printing said document to produce a printed document, using a printing device operatively connected to said computerized device, said selecting said first color and said second color, and said controlling said first pixel density to be less than said second pixel density causing said second color to have a greater change in brightness appearance relative to a change in brightness appearance of said first color when said printed document is viewed from different angles relative to a light source.

2. The method according to claim 1, said second color having a reflectance property that is at least twice a reflectance property of said first color.

3. The method according to claim 1, said controlling said first pixel density to be less than said second pixel density causing said first density to be less than 0.8 times said second density.

4. The method according to claim 1, said selecting said first color and said second color comprising changing marking material from that designated in said document.

5. A method comprising:

receiving a document to be printed into a computerized device, said document including a designation of an apparent color shift region within said document, said apparent color shift region comprising a background and a design in a foreground;

automatically, using said computerized device, selecting a first color to have a first reflectance property as said background and a second color to have a second reflectance property different from said first reflectance property as said foreground for use in said apparent color shift region;

automatically, using said computerized device, controlling a first pixel density of said first color to be less than a second pixel density of said second color within said apparent color shift region; and printing said document to produce a printed document, using a printing device operatively connected to said computerized device, said selecting said first color and said second color, and said controlling said first pixel density to be less than said second pixel density causing said second color to have a greater change in brightness appearance relative to a change in brightness appearance of said first color when said printed document is viewed from different angles relative to a light source.

6. The method according to claim 5, said second color having a reflectance property that is at least twice a reflectance property of said first color.

7. The method according to claim 5, said controlling said first pixel density to be less than said second pixel density causing said first density to be less than 0.8 times said second density.

8. The method according to claim 5, said selecting said first color and said second color comprising changing marking material from that designated in said document.

9. A system comprising:
a processor; and
a printer operatively connected to said processor,
said processor receiving a document to be printed, said document including a designation of an apparent color shift region within said document, said processor automatically selecting a first color to have a first reflectance property and a second color to have a second reflectance property different from said first reflectance property for use in said apparent color shift region, said processor automatically controlling a first pixel density of said first color to be less than a second pixel density of said second color within said apparent color shift region, said printer printing said document to produce a printed document, and said selecting said first color and said second color, and said controlling said first pixel density to be less than said second pixel density causing said second color to have a greater change in brightness appearance relative to a change in brightness appearance of said first color when said printed document is viewed from different angles relative to a light source.

10. The system according to claim 9, said second color having a reflectance property that is at least twice a reflectance property of said first color.

11. The system according to claim 9, said processor controlling said first pixel density to be less than said second pixel density causing said first density to be less than 0.8 times said second density.

12. The system according to claim 9, said selecting said first color and said second color comprising changing marking material from that designated in said document.

13. A system comprising:
a processor; and
a printer operatively connected to said processor,
said processor receiving a document to be printed, said document including a designation of an apparent color shift region within said document, said apparent color shift region comprising a background and a design in a foreground, said processor automatically selecting a first color to have a first reflectance property as said background and a second color to have a second reflectance property different from said first reflectance property as said foreground for use in said apparent color shift region, said processor automatically controlling a first pixel density of said first color to be less than a second pixel density of said second color within said apparent color shift region, said printer printing said document to produce a printed document, and said selecting said first color and said second color, and said controlling said first pixel density to be less than said second pixel density causing said second color to have a greater change in brightness appearance relative to a change in brightness appearance of said first color when said printed document is viewed from different angles relative to a light source.

14. The system according to claim 13, said second color having a reflectance property that is at least twice a reflectance property of said first color.

15. The system according to claim 13, said processor controlling said first pixel density to be less than said second pixel density causing said first density to be less than 0.8 times said second density.

16. The system according to claim 13, said selecting said first color and said second color comprising changing marking material from that designated in said document.

* * * * *